(12) United States Patent
deCarmo

(10) Patent No.: US 7,177,911 B2
(45) Date of Patent: Feb. 13, 2007

(54) SYSTEM AND METHOD FOR DISCOVERY AND REMOTE CONTROL OF COMPUTERS

(75) Inventor: Linden deCarmo, Plantation, FL (US)

(73) Assignee: Pace Micro Technology PLC, West Yorkshire (GB)

( * ) Notice: Subject to any disclaimer, the term of this patent is extended or adjusted under 35 U.S.C. 154(b) by 617 days.

(21) Appl. No.: 10/142,668

(22) Filed: May 9, 2002

(65) Prior Publication Data

US 2003/0212820 A1 Nov. 13, 2003

(51) Int. Cl.
G06F 15/16 (2006.01)
H04N 7/173 (2006.01)

(52) U.S. Cl. .................. 709/209; 709/208; 725/100

(58) Field of Classification Search ........ 709/208–209, 709/238; 725/100
See application file for complete search history.

(56) References Cited

U.S. PATENT DOCUMENTS

| | | | |
|---|---|---|---|
| 5,150,464 A | 9/1992 | Sidhu et al. | |
| 5,526,489 A | 6/1996 | Nilakantan et al. | |
| 5,565,908 A * | 10/1996 | Ahmad | 725/93 |
| 5,745,699 A | 4/1998 | Lynn et al. | |
| 5,835,725 A | 11/1998 | Chiang et al. | |
| 5,854,901 A | 12/1998 | Cole et al. | |
| 5,894,479 A | 4/1999 | Mohammed | |
| 5,999,974 A | 12/1999 | Ratcliff et al. | |
| 6,061,739 A | 5/2000 | Reed et al. | |
| 6,070,187 A | 5/2000 | Subramanian et al. | |
| 6,105,100 A | 8/2000 | Dean et al. | |
| 6,115,545 A | 9/2000 | Mellquist | |
| 6,192,397 B1 * | 2/2001 | Thompson | 709/209 |
| 6,195,687 B1 * | 2/2001 | Greaves et al. | 709/208 |
| 6,195,688 B1 * | 2/2001 | Caldwell et al. | 709/208 |
| 6,195,706 B1 | 2/2001 | Scott | |
| 6,449,289 B1 * | 9/2002 | Quicksall | 370/475 |
| 6,499,053 B1 * | 12/2002 | Marquette et al. | 709/204 |
| 2002/0147856 A1 * | 10/2002 | Sarkar et al. | 709/313 |

OTHER PUBLICATIONS

Marmor, M.S. "Make The P2P Leap With Toadnode," Web Techniques, Miller Freeman, US, vol. 5, No. 12, Dec. 2000, pp. 44-49.
Kozik, J. et al. "On Opening PSTN to Enhanced Voice/Data Services—The PINT Protocol Solution" Bell Labs Technology, Bell Laboratories, vol. 5, No. 3, Jul. 2000, pp. 153-165.
Stevens, W. Richard: "TCP/IP Illustrated, vol. 1: The Protocols," Professional Computing Series, Reading, MA: Addison-Wesley, 1994, pp. 19-23 and 34-37.

* cited by examiner

*Primary Examiner*—William Vaughn
*Assistant Examiner*—Peling A Shaw
(74) *Attorney, Agent, or Firm*—Chinh H. Pham; Greenberg Traurig, LLP

(57) ABSTRACT

A system and method for enabling computers associated with a communications network to remotely locate each other and establish a master-slave relationship.

14 Claims, 3 Drawing Sheets

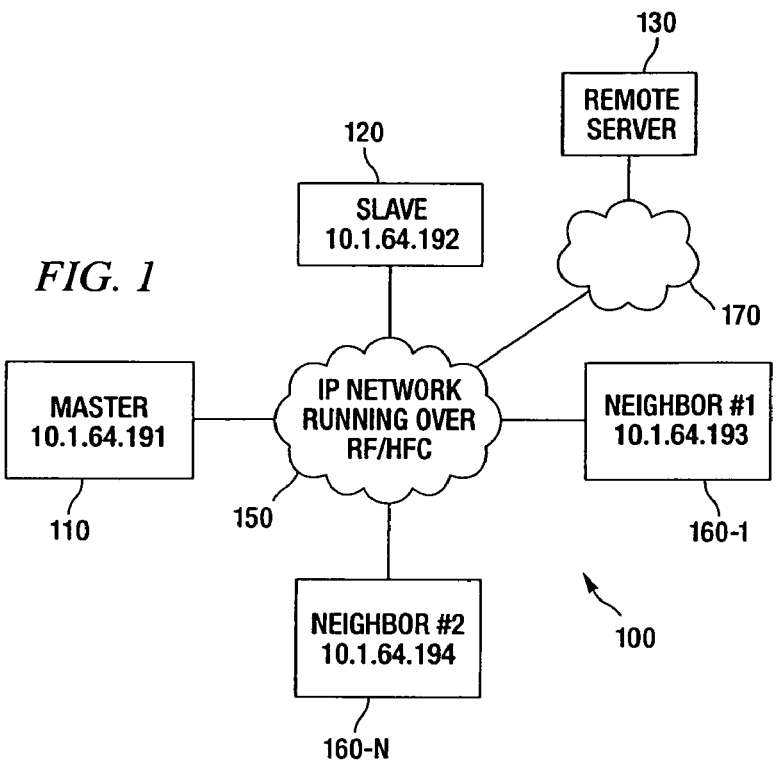
FIG. 1
FIG. 3a
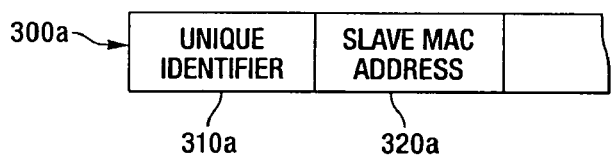
FIG. 3b
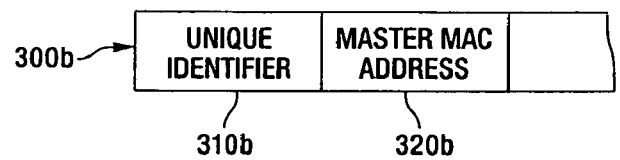
FIG. 3c
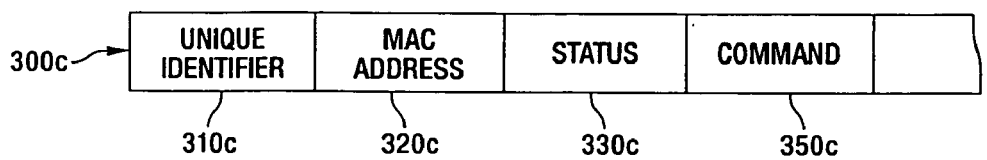

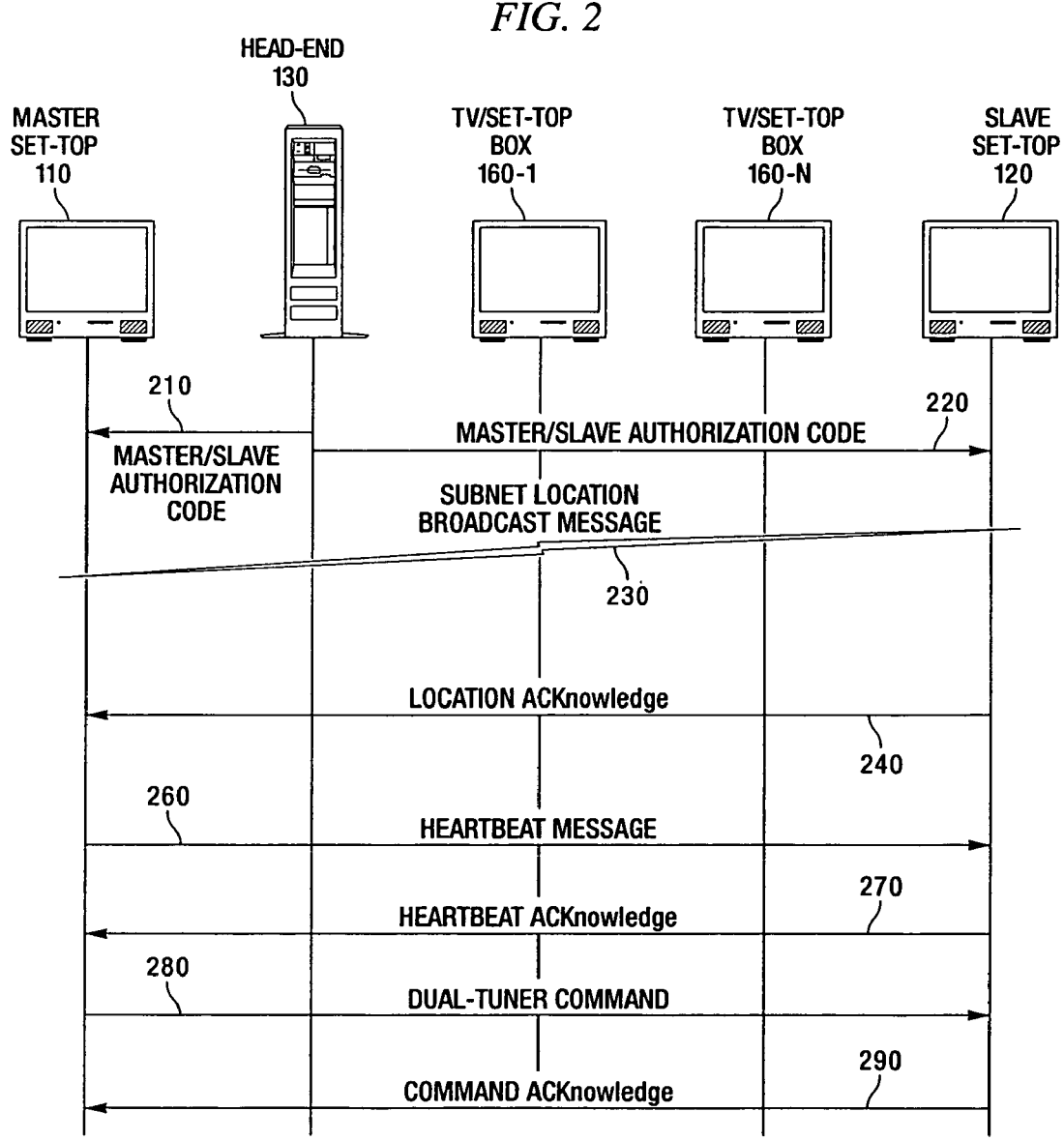

SYSTEM AND METHOD FOR DISCOVERY AND REMOTE CONTROL OF COMPUTERS

FIELD OF THE INVENTION

The invention relates to a communications system and method, and more particularly to a system and method for enabling computers associated with a communications network to remotely locate each other and establish a master-slave relationship.

BACKGROUND OF THE INVENTION

A prior art community access television (CATV) system typically requires that a set top terminal be connected to a user's television set to receive channels or special select services offered by the CATV provider. In a digital CATV network environment, CATV providers assign Internet Protocol (IP) addresses to each set top terminal connected to the network. The IP addresses are used to distinguish one set top terminal from another so that direct channels, channel information and/or select services in the form of data can be delivered from a headend to a specific set top terminal. Because set top terminals are not permanently located within the CATV system, addresses are often reassigned to set top terminals. For example, a user could move to a different location and install the set top terminal at the new location, purchases a new set top terminal, add a second set top terminal to the location, or remove a set top terminal from the location.

Additionally, more than one set top terminal can be found in a user's home. When there is more than one set top terminal in a user's home, the set top terminals can function in a master-slave relationship. In prior art CATV systems, the master-slave arrangement requires a technically knowledgeable installer to go to the user's home and connect a serial cable between the master and slave set top terminals. The serial cable is used to transfer commands from the master set top terminal to the slave terminal. Commands are initiated when a user presses a key on a keypad of a remote control device. The remote control device transmits a signal (often an infrared (IR) signal) to the set top terminal. Because both set top terminals are in the same proximity, the slave terminal can mistakenly receive commands from the remote control that were intended for the master set top terminal. In prior art CATV systems, because the master and the slave set top terminals are connected together by a serial cable the problem of mistakenly receiving commands cannot be easily solved by placing the slave set top terminal in a separate room. The present invention solves these problems by enabling set top terminals or other computer type devices or computers associated with a communications network to remotely locate each other and establish a master-slave relationship without initially knowing the other's IP address.

SUMMARY OF THE INVENTION

The present invention is directed towards a system and method for enabling computers associated with a communications network to remotely locate each other and establish a master-slave relationship. A master computer having a MAC address and a slave computer having a MAC address are part of a communications network. A remote computer having knowledge of the MAC addresses of the master and slave computers sends a message to each computer notifying them of each other's MAC address. Knowing the MAC address of the slave computer, the master computer broadcasts a message including the MAC address of the slave computer to all of the computers associated with the communications network. The slave computer recognizes its MAC address in the message and establishes a connected socket with the master computer. The slave computer sends a message to the master computer and the master computer establishes a connected socket with the slave computer, so that commands can be directly communicated from the master computer to the slave computer.

BRIEF DESCRIPTION OF THE DRAWINGS

FIG. 1 depicts a high level block diagram of an illustrative arrangement of the hardware components of the present invention;

FIG. 2 is an illustration of data flow throughout the system;

FIG. 3a is an illustration of a message data packet processed by a remote server for communicating with a master computer;

FIG. 3b is an illustration of a message data packet processed by a remote server for communicating with a slave computer;

FIG. 3c is an illustration of a message data packet processed by a master computer and/or a slave computer for communicating with each other;

DETAILED DESCRIPTION

Figure 4:
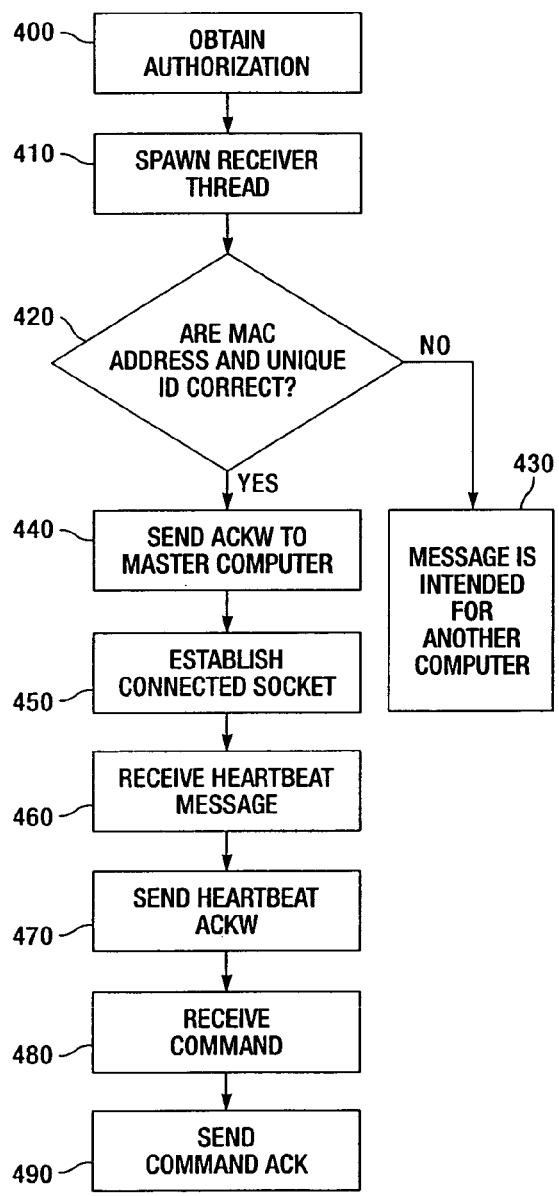
FIG. 4 is a flow chart depicting a process that is implemented by a slave computer.

The present invention is directed towards a technique for enabling computers associated with a communications network to remotely locate each other and establish a master-slave relationship. In accordance with the invention a computer selects at least one computer to act as a master computer and selects at least another computer to act as a slave computer. Without knowing the IP address of the designated slave computer, the master computer locates the slave computer and the two computers engage in a master-slave relationship over a communications network shared with other computers.

FIG. 1 illustrates a system, which embodies the principles of the invention. As shown in FIG. 1, system 100 includes, master computer 110, slave computer 120, remote server 130, communications sub-network 150, communications network 170, and computers 160-1 through 160-N, where N is a number greater than one. Master computer 110, slave computer 120, and computers 160-1 through 160-N can be any computing device, such as a multimedia terminal or a televisions set-top terminal. Remote server 130 is a computer that provides various services and has the capability to communicate with the various computers connected to communications network 150 and communications sub-network 170. Remote server 130 can be a community access television (CATV) head-end.

Communications network 170 and communications sub-network 150 can be any type of communications network that utilizes the Internet Protocol, such as a radio frequency (RF) or hybrid fiber coax (HFC) network utilizing the Internet Protocol. It should be realized that any transport protocol and any network topology that can function in a sub-network environment can be utilized. One advantage of using a sub-network is that communications between master computer 110, slave computer 120, and computer 160-1 through 160-N are not broadcast over the entire network, thus minimizing network traffic and noise on the network. Because the entire communications network is not subjected to broadcasts from the computers in communications sub-network 150 looking for their designated slave computer, there is no performance penalty for communicating with a computer for no reason.

Before any of the computers can operate in a master-slave relationship an operator at remote server 130 can either authorize which computers are to receive authority to operate in a master-slave relationship, or the operator can designate which computers are to operate as the master and the slave computers. In the situation where the operator authorizes which computers are to receive authority to operate in a master-slave relationship, a user at the location of the computer(s) selects via a user interface which computer is to operate as the master. Where the operator selects which computers are to receive such master and slave designation, remote server 130 retrieves the MAC addresses of the selected computers from a list of MAC addresses stored in remote server 130 and broadcasts messages including the MAC addresses over communication network 170 and communication sub-network 150.

FIG. 2 is a data flow diagram that illustrates exemplary exchange of information throughout system 100, which is necessary to authorize and enable computers to engage in a master-slave relationship, such as master computer 110 having remote control capabilities of slave computer 120. More particularly, FIG. 2 illustrates exemplary data flow among remote server 130, master computer 110, and slave computer 120.

As mentioned above, the operator of remote server 130 selects which computers are designated as a master and a slave. Knowing the MAC addresses of the computers associated with communications network 170 and communications sub-network 150, remote server 130 can broadcast messages over the network and sub-network that are intended for a master computer having a particular MAC address and a slave computer having a particular MAC addresses.

When remote server 130 broadcasts a message to two computers to authorize master-slave operations, a message protocol is used. FIG. 3a illustrates an exemplary message protocol for remote server 130 to follow when sending a message to authorize and enable master-slave operations. It should be realized that the message protocols disclosed in FIGS. 3a through 3c illustrate the layout for IP communications, thus different layouts can be used for different protocols. Not shown in FIGS. 3a through 3c are fields related to basic header information and are known within the art, such as sequence numbers, packet length and other house keeping information. By way of example, a master message data packet 300a represents the message directed to master computer 110. Master message data packet 300a includes a unique identifier field 310a and MAC address field 320a. The unique identifier field 310a includes information related to a unique identifier, such as a billing number associated with a particular billing address. The MAC address field 320a includes the MAC address of the computer assigned as the slave computer, which in this case is slave computer 120.

FIG. 3b illustrates an exemplary message protocol for remote server 130 to follow when sending a message directed to a slave computer to authorize and enable slave operations. By way of example, a slave message data packet 300b represents the message directed to slave computer 110. In this example, remote server 130 broadcasts a slave message data packet 300b, which includes a unique identifier field 310b and a MAC address field 320b. The unique identifier field 310b includes an identical identifier to the one in unique identifier field 310a. The MAC address field 320b includes the MAC address of the other computer, which in this case is the master computer 110. Thus, once these messages are broadcast and received by the intended recipients, each recipient is aware of the other's MAC address. It should be realized that at this time the IP address of master computer 110 is unknown to slave computer 120, and the IP address of slave computer 120 is unknown to master computer 110.

Referring back to FIG. 2, at data flow 210, remote server 130 broadcasts a master message data packet 300a over communications network 150 and communications sub-network 170 to all computers. At data flow 220, remote server 130 broadcasts a slave message data packet 300b over communications network 150 and communications sub-network 170 to all computers.

When slave computer 120 receives slave message data packet 300b, slave computer 120 begins to perform the process shown in FIG. 4. FIG. 4 is a flow chart illustrating the process of enabling and authorizing a computer to act as a slave computer. At block 400, slave computer 120 receives slave message data packet 300b, which authorizes slave computer 120 to process remote control requests from a master computer having the MAC address stored in MAC address field 320b, in this illustrative example the master computer is master computer 110. At block 410, slave computer 120 spawns its receiver thread, thus dedicating a path of execution to process all message from master computer 110.

Figure 5:
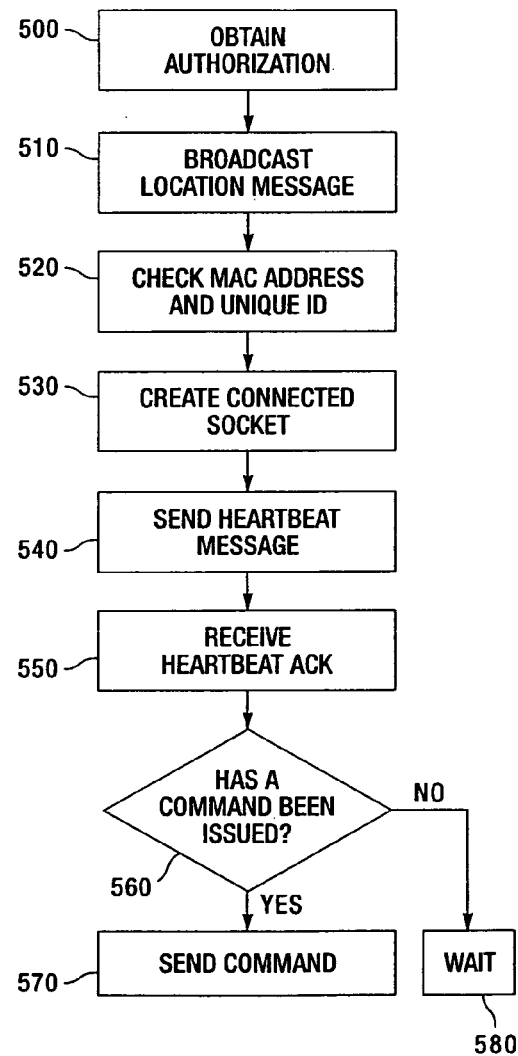
FIG. 5 is a flow chart depicting a process that is implemented by a master computer.

Referring to FIG. 2, data flow 220, master computer 110 receives master message data packet 300a and begins to perform the process shown in FIG. 5. FIG. 5 is a flow chart illustrating the process of enabling and authorizing a computer to operate as a master computer. At block 500, master computer 110 receives master message data packet 300a, which authorizes master computer 110 to control a slave computer having a MAC address identical to the MAC address in MAC address field 320a, in this illustrative example the slave computer is slave computer 120.

FIG. 3c illustrates an exemplary message protocol for master computer 110 and slave computer 120 to follow when sending messages to each other. By way of example, message data packet 300c includes a unique identifier field 310c, which contains a copy of the unique identifier that was broadcast by remote server 130 to master computer 110 and slave computer 120. The unique identifier in unique identifier field 310c is identical to the unique identifiers in unique identifier fields 310a and 310b. Also included in message data packet 300c is a MAC address field 320c, which includes information pertaining to the sender's MAC address. It should be realized that slave computer 120 does not know the IP address of master computer 110, but is aware of the MAC address of master computer 110. Thus, the MAC address of master computer 110 is included in message data packet 300c so that slave computer 120 can compare the MAC addresses and determine whether message data packet 300c is from a computer assigned to it as a master computer. This reduces the chances of spoofing by other computers.

Because master computer 110 does not know the IP address of slave computer 120, at block 510, master computer 110 broadcasts message data packet 300c to all of the computers associated with communications sub-network 150. The message data packet 300c is specifically formatted, by methods known in the art, to stay within communications sub-network 150, for example, by using a sub-network mask. Included in MAC address field 320c is the MAC address of master computer 110. Not included in message data packet 300c is the expected MAC address of slave computer 120. FIG. 2, at data flow 230, shows the data packet flow from master computer 110 to the various computers connected to communications sub-network 150, including slave computer 120.

One computer that will receive message data packet 300c from master computer 120 is slave computer 120. Message data packet 300c includes MAC address field 320c, which contains data that represents the MAC address of the sending computer, and unique identifier field 310c, which contains a unique identifier known only to the computers in the master-slave relationship. In FIG. 4, at decision block 420, slave computer 120 determines whether the MAC address from MAC address field 320c and unique identifier from unique identifier field 310c match the information in MAC address field 320b and unique identifier field 310b sent by remote server 130. If the MAC address and unique identifier are not identical to the address and identifier broadcast by remote server 130 in slave message data packet 300b then, at block 430, slave computer 120 determines that message data packet 300c is intended for another computer and ignores it. If slave computer 120 determines that message data packet 300c is intended for itself, then at block 440, slave computer 120 sends a similar message data packet to master computer 120 acknowledging that message data packet 300c was received by its intended recipient. Included in the message data packet sent to master computer 110 is the MAC address of slave computer 120. The data flow of this message from slave computer 120 to master computer 110 is illustrated in FIG. 2 at data flow 240.

At block 450, slave computer 120 creates a connected socket with master computer 110. Because in this illustration, a user data (UDP) protocol is being utilized, which is a connectionless protocol, it is necessary to create both ends of the communication path between computers. Given that the messages are being sent over IP protocol, the IP address of master computer 110 is now know to slave computer 120 and slave computer 120 can communicate to master computer 110, using the IP address. The MAC addresses can continue to be utilized to prevent spoofing.

When master computer 110 receives message data packet 300c from slave computer 120 it reads the information in MAC address field 320c and in the unique identifier field 310c. After master computer 110 reads the information in the MAC address field 320c, which is the MAC address of slave computer 120 (sender), it compares the MAC address to the MAC address received from remote server 130 in MAC address field 320a. If the MAC addresses are identical, then master computer 110 determines whether the information in the unique identifier field 310c is identical to the unique identifier from unique identifier field 310a in master message data packet 300a received from remote server 130. If both of the unique identifiers are identical and both of the MAC addresses are identical then, at block 530, master computer 110 creates a connected socket to slave computer 120. Prior to block 530, master computer 110 was broadcasting messages over communications sub-network 150 and had not established a connected socket with any computers, including slave computer 120. Because the messages are being sent over IP protocol, the IP address of slave computer 120 is now know to master computer 110 and master computer 110 can communicate to slave computer 120, using the IP address. At block 530, master computer 110 disables the broadcast socket and opens a connected socket with slave computer 120.

Once a connected socket is established between master computer 110 and slave computer 120, master computer 110, at block 540, begins to periodically send heartbeat messages to slave computer 120. The heartbeat messages are used to validate whether the connected socket is still established. The messages include the MAC address of the computer sending the message and unique identifier. Master computer 110 sends a heartbeat message requesting slave computer 120 to verify that it is still operating and maintaining the connected socket. If slave computer 120 responds, then master computer 110 continues to engage in the master-slave relationship with slave computer 120 and waits a predetermined time frame before sending another heartbeat message.

Referring to FIG. 4, at block 460, the heartbeat message is received by slave computer 120. If the heartbeat message is intended for slave computer 120, at block 470, slave computer 120 sends a heartbeat acknowledgement message to master computer 120. This heartbeat message acknowledges that slave computer 120 received the heartbeat message from master computer 120 and that the connected socket is still established. The data flow of the heartbeat message and the heartbeat message acknowledgment, sent by master computer 110 and slave computer 120, are illustrated in FIG. 2 at data flow 260 and data flow 270 respectively.

While master computer 110 and slave computer 120 exchange periodic heartbeat messages, master computer 110 performs various functions. For example, the user of master computer 110 can enter, using a user interface, a command to change the state or function of slave computer 120. When this occurs, master computer 110 prepares to send a message, which includes the command, to slave computer 120 using message data packet 300c. Referring back to FIG. 3c, a dual turner command field 350c is provided to communicate commands from master computer 110 to slave computer 120 using message data packet 300c. A nonlimiting example of commands are: record, stop, play, forward, establish connection, tune channel, or any other command required to perform a function in a remote computer.

Referring to FIG. 5, if at block 560, master computer 120 receives a command to control slave computer 120, it prepares message data packet 300c and includes the command in command field 350c. At block 570, master computer 110 sends message data packet 300c to slave computer 120. Referring to FIG. 4, at block 480, the slave computer 120 receives message data packet 300c and repeats the process discussed above for determining whether message data packet 300c is from its assigned master computer. Additionally, slave computer 120 reads the command in command field 350c and processes the command. At block 490, slave computer 120 sends to master computer 110 message data packet 300c, which acknowledges the receipt and initiation of the command by the slave computer 120. The data flow of message data packets 300c, sent by master computer 110 and slave computer 120, are illustrated in FIG. 2 at data flow 280 and data flow 290 respectively.

In another illustrative example, if slave computer 120 is assigned a new IP address or is having its IP address taken away, slave computer 120 sends message data packet 300c to master computer 110 indicating such change or removal. Referring to FIG. 3c, message data packet 300c includes a status field 330c. This field contains information indicating whether the IP address has been changed, taken away, or is no longer associated with slave computer 120. When master computer 110 receives message data packet 300c, it reads the information in status field 330*c* and if the indicator indicates that the IP address of the sender is not changing or not being removed, then master computer 110 continues to process the information in message data packet 300*c*, as disclosed above. If the information in status field 330*c* indicates that the IP address has been changed, taken away, or is no longer associated with slave computer 120, then master computer 110 stops communicating with slave computer 120. Master computer 110 will enter promiscuous mode (i.e. it resumes sending out subnet broadcasts searching for its associated slave) until it receives from remote server 130 a master message data packet 300*a* indicating which computer in communications sub-network 150 to locate and engage in a master-slave relationship.

The user may, at their discretion, break the master/slave relationship from either the master or slave. A specific command is emitted from the breaker to the breakee. When this message is received and acknowledged, all communications between the parties cease until the user re-enables the master/slave relationship as previously described.

Table 1 shows exemplary pseudo code for implementing the various communications and processes disclosed above.

TABLE 1

```
ObtainAuthorization( )
SpawnThreads( )
queueProcessing:
    case incomingPacket:
        ExecuteCommand( );
    case writePacket:
        inform sender of success
ExecuteCommand( );
    Is command valid?
        Yes. Execute and send ACK.
        No. Ignore.
Receiver thread:
while (TRUE)
    getAPacket( )
    if (isPacketLegit( ))
        establish connection
    does status bit indicate set-top has moved IP address?
        Yes. Remember MAC address in packet header.
        Reset flags used by write thread to indicate new address
        for attached machine.
    Send message to queue indicating incoming packet is available
isPacketLegit( )
    if packet doesn't come from our IP address AND packet
    contains uniqueid
        Are we connected?
            No. Remember MAC address in packet header
                return TRUE
            Yes. If MAC address matches the MAC address we expect
    else
        return FALSE
Sender thread:
while (TRUE)
    If(!connected to remote terminal)
        Send packet to IP address of our remote machine
    Else
        Broadcast packet to all machines in subnet.
    If we receive a legit incoming packet
        Remember sender's address for subsequent packet transmissions
    Send message to queue indicating write was successful
```

The above presents various principles and features of the invention through descriptions of various embodiments. It is understood that skilled artisans can make various changes and modifications to the embodiments without departing from the spirit and scope of this invention, which is defined by the following claims.

I claim:

1. A system for enabling computers associated with a communications network to remotely locate each other and establish a master-slave relationship comprising:
    a first computer having a first MAC address associated therewith;
    a second computer having a second MAC address associated therewith and the first computer and second computer part of the communications network; and
    a third computer, remotely situated from outside a subnet communication network including the first and second computers, having knowledge of the first MAC address and the second MAC address and sending a first message having the first MAC address and a unique identifier to the second computer and a second message having the second MAC and the unique identifier address to the first computer over the communications network;
    wherein, subsequent to the first and second messages from the third computer, the first computer broadcasts a third message having the first MAC address and the unique identifier over the communications network and in response to the third message the second computer establishes a connected socket between the second computer and the first computer.

2. The system of claim 1 wherein the second computer responds with a fourth message having the second MAC address.

3. The system of claim 1 wherein the first computer sends a heartbeat message to the second computer.

4. The system of claim 3 wherein the second computer responds to the heartbeat message.

5. The system of claim 1 wherein the first computer sends a fifth message including a command to control the second computer.

6. The system of claim 1 wherein the second computer sends a sixth message including an indication of a change in IP address of the second computer.

7. The system of claim 1 wherein the first computer stops communicating with the second computer and disables the connected socket.

8. The system of claim 1 wherein the second MAC address is used to locate the second computer among the computers in the communications network and determine an IP address of the second computer.

9. The system of claim 1 wherein a user can break the master/slave relationship.

10. A method for enabling computers associated with a communications network to remotely locate each other and establish a master-slave relationship comprising:
    broadcasting over the communications network by a remote computer a first message having a first MAC address associated with a first computer and a unique identifier;
    broadcasting over the communications network by a remote computer a second message having a second MAC address associated with a second computer and the unique identifier;
    broadcasting over the communications network a third message having the unique identifier and the second MAC address by the second computer;
    establishing a connected socket by the first computer;
    broadcasting over the communications network a fourth message having the first MAC address and the unique identifier by the first computer; and
    establishing a second connected socket by the second computer.

11. The method of claim 10 further comprising sending a fifth message to the first computer through the connected socket.

12. A method for establishing a master-slave relationship among computer in a communications network comprising:
   receiving from a remote computer a first MAC address associated with a master computer and a unique identifier;
   subsequent to receiving the MAC address from the remote computer, broadcasting by a slave computer a first message having a second MAC address associated with the slave computer and the unique identifier;
   receiving from the master computer a second message having the first MAC address and the unique identifier; and
   establishing a connected socket over the communications network with the master computer.

13. The method of claim 12 further comprising sending a third message having a command for the first computer via the connected socked over the communications network.

14. The method of claim 12 wherein a user can break the master/slave relationship.

* * * * *